E. J. PECK.
Improvement in Bee-Hives.
No. 126,229.
Patented April 30, 1872.
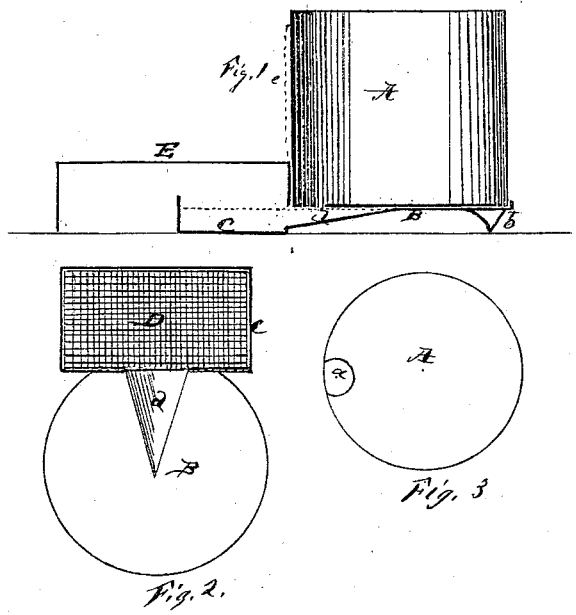
Witness
Geo Hester
C E Wyman
Inventor
E. J. Peck
per Geo. W. Tibbitts
Atty

UNITED STATES PATENT OFFICE.

ELISHA J. PECK, OF LINDEN, NEW JERSEY.

IMPROVEMENT IN BEE-FEEDERS.

Specification forming part of Letters Patent No. 126,229, dated April 30, 1872; antedated April 13, 1872.

SPECIFICATION.

I, ELISHA J. PECK, of Linden, in the county of Union and State of New Jersey, have invented a certain new and Improved Feeding Device for Feeding Bees, and for other purposes, of which the following is a specification:

The nature of this invention relates to the combination of a box, can, or similar suitable vessel inclosed on all sides, except a small opening in one corner of the bottom, it being otherwise air-tight, with a separate pan or bottom having a groove or trough under said opening leading to a second pan or receptacle, into which a liquid is to be supplied for feeding bees. This apparatus acting on the pneumatic principle, the liquid in the reservoir supplies the feed-pan automatically as the liquid may be taken up by the bees.

The invention consists in the construction and arrangement of the reservoir in such a manner with the feed-pan that it can be removed from the feed-pan and replaced at pleasure without spilling the contents of the reservoir or disturbing the feed-pan or the bees feeding thereat.

In the accompanying drawing, Figure 1 is a sectional view of my feeding apparatus. Fig. 2 is a plan view of the feed-pan and bottom. Fig. 3 is a plan view of the bottom of the reservoir.

A represents a reservoir, in which I place the honey or other liquid, which may be made round or square, and of suitable size, of tin or other suitable material, the top and bottom being permanently attached, so as to make it perfectly air-tight. The only opening I make in it is seen at $a$, Fig. 3, which is a small round hole cut at one side of the head or bottom. This opening is for the purpose of filling the reservoir when required, and is also the egress of the liquid when the apparatus is connected together. B is a bottom or base, upon which the reservoir sets, and is connected to a feed-pan, C, the bottom of which is somewhat lower than the base B, said base being supplied with a foot or leg, $b$, to support it. In the base B is made a trough or groove, $d$, communicating with the pan C; the reservoir A, when in place, setting over said trough, with its opening $a$ directly over the trough, and leading into it.

When the reservoir is thus placed over the trough the liquid will flow into the trough, thence into the feed-pan, and fill it up to the dotted line $c$; the liquid rising to the level of the opening $a$ in the reservoir will cease to flow, because no more air can enter the said opening.

As a feeding apparatus for bees this apparatus is peculiarly adapted, and when used for that purpose a floor or cover of wire-cloth or other suitable perforated material D is placed over the honey in the feeding-pan C, upon which the bees may stand and sip up the honey through the interstices; and as fast as the honey is taken the feed-pan will be replenished from the reservoir.

The apparatus, when employed for feeding bees, is placed on top of the comb-frames in a hive, in the upper chamber, under the cover or top of the hive.

To protect the bees from the cold, and to retain the warmth of the hive, a cover, E, considerably larger than the pan C, is placed over it. The portion of the cover extending beyond the pan C is over the openings between the comb-frames, leaving a communication for the bees to pass up and go to the feed-pan.

When the reservoir A becomes exhausted it may be removed, refilled, and replaced without in the least disturbing the bees.

Having thus described my invention, I claim—

The combination, in a bee-feeding device, of the reservoir A, base B, trough $d$, feed-pan C, wire guard D, and cover E, the several parts being constructed and arranged as herein shown and described.

E. J. PECK.

Witnesses:
GEO. W. TIBBITTS,
GEO. HESTER.